(12) United States Patent
Dalonzo

(10) Patent No.: US 11,068,137 B2
(45) Date of Patent: Jul. 20, 2021

(54) SYSTEMS AND METHODS FOR AUGMENTING CONTENT

(71) Applicant: Facebook, Inc., Menlo Park, CA (US)

(72) Inventor: Christian Xavier Dalonzo, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 60 days.

(21) Appl. No.: 15/846,135

(22) Filed: Dec. 18, 2017

(65) Prior Publication Data

US 2019/0187880 A1    Jun. 20, 2019

(51) Int. Cl.
| | | |
|---|---|---|
| G06F 17/10 | (2006.01) | |
| G06F 3/0484 | (2013.01) | |
| G06T 11/60 | (2006.01) | |
| G06F 3/16 | (2006.01) | |
| G11B 27/00 | (2006.01) | |

(52) U.S. Cl.
CPC .......... *G06F 3/04842* (2013.01); *G06F 3/165* (2013.01); *G06T 11/60* (2013.01); *G11B 27/00* (2013.01)

(58) Field of Classification Search
CPC ...... G06F 3/04842; G06F 3/165; G06T 11/60; G11B 27/00
See application file for complete search history.

(56) References Cited

U.S. PATENT DOCUMENTS

| | | | |
|---|---|---|---|
| 2007/0028183 A1* | 2/2007 | Ostojic | H04N 7/17318 |
| | | | 715/768 |
| 2010/0131895 A1* | 5/2010 | Wohlert | H04L 65/604 |
| | | | 715/811 |
| 2011/0051787 A1* | 3/2011 | Warren | H04B 7/00 |
| | | | 375/224 |
| 2014/0189524 A1* | 7/2014 | Murarka | G06F 16/958 |
| | | | 715/744 |
| 2014/0379799 A1* | 12/2014 | LeCroy | H04L 51/063 |
| | | | 709/204 |
| 2015/0302108 A1* | 10/2015 | Trivedi | G06F 16/40 |
| | | | 715/201 |
| 2016/0196052 A1* | 7/2016 | Franklin | G06F 3/04845 |
| | | | 715/765 |
| 2016/0350953 A1* | 12/2016 | Mittelstaedt | G06T 11/60 |
| 2016/0357355 A1* | 12/2016 | Carrigan | H04L 67/22 |
| 2017/0193280 A1* | 7/2017 | Huang | G06F 16/44 |
| 2017/0263029 A1* | 9/2017 | Yan | G06F 3/04845 |
| 2017/0336926 A1* | 11/2017 | Chaudhri | H04L 51/22 |
| 2018/0137660 A1* | 5/2018 | De Abreu Rodriguez | |
| | | | G06Q 50/01 |
| 2019/0205645 A1* | 7/2019 | Bates | G06F 16/583 |

\* cited by examiner

*Primary Examiner* — Shahid K Khan
(74) *Attorney, Agent, or Firm* — Sheppard Mullin Richter & Hampton LLP

(57) ABSTRACT

Systems, methods, and non-transitory computer readable media can provide one or more candidate stickers through a display screen of a computing device. A determination can be made that a user has selected a first sticker from the one or more candidate stickers. The first sticker can be inserted as a graphical overlay in a content item. The first sticker can reference first content.

11 Claims, 11 Drawing Sheets

500

```
Provide one or more candidate stickers through
a display screen of a computing device
502
          │
          ▼
Determine that a user has selected a first sticker from the one
or more candidate stickers
504
          │
          ▼
Insert the first sticker as a graphical overlay into
a content item, wherein the first sticker references first content
506
```

Present one or more stickers as graphical overlays in a content item
512

Determine that a user has selected a first sticker from the one or more stickers in the content item
514

Access content associated with the first sticker
516

FIGURE 5B

SYSTEMS AND METHODS FOR AUGMENTING CONTENT

FIELD OF THE INVENTION

The present technology relates to the field of content provisioning. More particularly, the present technology relates to techniques for content augmentation in a social networking system.

BACKGROUND

Today, people often utilize computing devices (or systems) for a wide variety of purposes. Users can use their computing devices, for example, to interact with one another, create content, share content, and view content. In some cases, a user can utilize his or her computing device to access a social networking system (or service). The user can provide, post, share, and access various content items, such as status updates, images, videos, audios, articles, and links, via the social networking system.

SUMMARY

Various embodiments of the present disclosure can include systems, methods, and non-transitory computer readable media configured to provide one or more candidate stickers through a display screen of a computing device. A determination can be made that a user has selected a first sticker from the one or more candidate stickers. The first sticker can be inserted as a graphical overlay in a content item. The first sticker can reference first content.

In an embodiment, the first sticker is a music sticker, and the first content is audio content.

In an embodiment, the first music sticker can be provided based on audio content being played using the computing device.

In an embodiment, the first music sticker can be provided based on a list of popular songs.

In an embodiment, the list of popular songs is obtained from at least one third-party content provider through one or more publicly available application programming interfaces (APIs).

In an embodiment, the first music sticker can be provided in response to a search query.

In an embodiment, the visual overlay includes content visually representing the first content.

In an embodiment, the first content corresponds at least an artist, an album, a song, a movie, a video, or other audio or video content.

In an embodiment, the first sticker is able to be selected to play the first content.

In an embodiment, the first sticker is able to be selected to download the first content.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

BRIEF DESCRIPTION OF THE DRAWINGS

FIG. 5A illustrates an example method, according to an embodiment of the present disclosure.

FIG. 5B illustrates another example method, according to an embodiment of the present disclosure.

Figure 1:
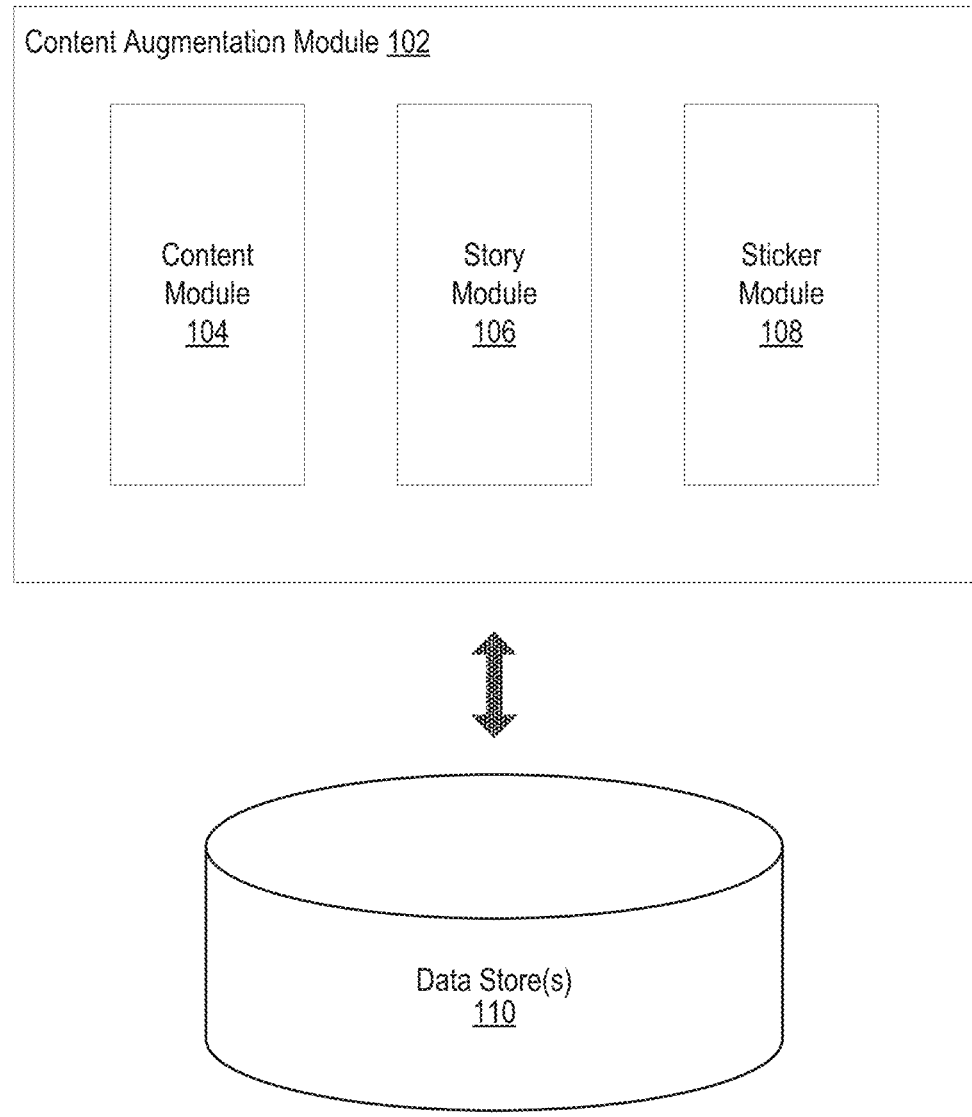
FIG. 1 illustrates an example system including an example content augmentation module, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Approaches for Augmenting Content

People use computing devices (or systems) for a wide variety of purposes. Computing devices can provide different kinds of functionality. Users can utilize their computing devices to produce information, access information, and share information. In some cases, users can utilize computing devices to interact or engage with a social networking system (e.g., a social networking service, a social network, etc.). A social networking system may provide resources through which users can publish content items. In one example, a content item can be published through a profile page of a user. As another example, a content item can be published through content feeds for users to access. As yet another example, a user can publish content items as part of a story (or story feed).

A social networking system may also provide resources through which a user may create and share content. For example, a user can create a content item that includes visual overlays such as emojis (e.g., emoticons). Such visual overlays can be inserted to convey a general mood or some other expression, for example. The created content item can be posted (or shared) through a social networking system. In general, such visual forms of expression can be limiting for users especially in a social networking context. For example, users of the social networking system may want to express themselves in other ways. Accordingly, such conventional approaches may not be effective in addressing these and other problems arising in computer technology.

An improved approach rooted in computer technology overcomes the foregoing and other disadvantages associated with conventional approaches specifically arising in the realm of computer technology. In various embodiments, users can access and insert stickers, such as music stickers, into content items. In some embodiments, a music sticker can be visual overlay that references particular audio content (e.g., a song). For example, a user can insert a music sticker in a content item. The music sticker may reference a particular song. The content item, along with the inserted music sticker, can be shared through a social networking system. In some embodiments, a user accessing the content item through the social networking system can interact with the music sticker. For example, in some embodiments, the user can select the music sticker to play the song associated with the music sticker through a computing device being operated by the user. In some embodiments, upon selecting the music sticker, a set of options can be provided for accessing (or obtaining) the song associated with the music sticker. In addition to audio content, stickers can reference other types of content, such as video content. More details relating to the disclosed technology are provided below.

FIG. 1 illustrates an example system 100 including an example content augmentation module 102, according to an embodiment of the present disclosure. As shown in the example of FIG. 1, the example content augmentation module 102 can include a content module 104, a story module 106, and a sticker module 108. In some instances, the example system 100 can include at least one data store 110. The components (e.g., modules, elements, etc.) shown in this figure and all figures herein are exemplary only, and other implementation may include additional, fewer, integrated, or different components. Some components may not be shown so as not to obscure relevant details.

In some embodiments, the content augmentation module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the content augmentation module 102 or at least a portion thereof can be implemented using one or more computing devices or systems that include one or more servers, such as network servers or cloud servers. In some instances, the content augmentation module 102 can, in part or in whole, be implemented within or configured to operate in conjunction with a social networking system (or service), such as the social networking system 630 of FIG. 6. In some instances, the content augmentation module 102 can be, in part or in whole, implemented within or configured to operate in conjunction or be integrated with a client computing device, such as the user device 610 of FIG. 6. For example, the content augmentation module 102 can be implemented as or within a dedicated application (e.g., app), a program, or an applet running on a user computing device or client computing system. The application incorporating or implementing instructions for performing some, or all, functionality of the content augmentation module 102 can be created by a developer. The application can be provided to or maintained in a repository. In some cases, the application can be uploaded or otherwise transmitted over a network (e.g., Internet) to the repository. For example, a computing system (e.g., server) associated with or under control of the developer of the application can provide or transmit the application to the repository. The repository can include, for example, an "app" store in which the application can be maintained for access or download by a user. In response to a command by the user to download the application, the application can be provided or otherwise transmitted over a network from the repository to a computing device associated with the user. For example, a computing system (e.g., server) associated with or under control of an administrator of the repository can cause or permit the application to be transmitted to the computing device of the user so that the user can install and run the application. The developer of the application and the administrator of the repository can be different entities in some cases, but can be the same entity in other cases. It should be understood that many variations are possible.

In some embodiments, the content augmentation module 102 can be configured to communicate and/or operate with the at least one data store 110, as shown in the example system 100. The at least one data store 110 can be configured to store and maintain various types of data. For example, the data store 110 can store information corresponding to music stickers that can be inserted into content items. In some implementations, the at least one data store 110 can store information associated with the social networking system (e.g. the social networking system 630 of FIG. 6). The information associated with the social networking system can include data about users, social connection, social interactions, locations, geo-fenced areas, maps, places, events, pages, groups, posts, communications, content, feeds, account settings, privacy settings, a social graph, and various other types of data. In some implementations, the at least one data store 110 can store information associated with users, such as user identifiers, user information, profile information, user locations, user specified settings, content produced or posted by users, and various other types of user data. In some embodiments, the at least one data store 110 can store information that is utilized by the content augmentation module 102. Again, it is contemplated that there can be many variations or other possibilities.

The content module 104 can be configured to provide users with access to content (e.g., content items) that is available through a social networking system. In some instances, this content can include content items that are posted in content feeds (e.g., story feeds) accessible through the social networking system. For example, the content module 104 can provide a first user with access to content items through an interface that is provided by a software application (e.g., a social networking application) running on a computing device of the first user. The first user can also interact with the interface to post content items to the social networking system. Such content items may include text, images, audio, and videos, for example. For example, the first user can submit a post to be published through the social networking system. In some embodiments, the post can include, or reference, one or more content items.

In various embodiments, other users of the social networking system can access content items posted by the first user. In one example, the other users can access the content items by searching for the first user, for example, by user name through an interface provided by a software application (e.g., a social networking application, browser, etc.) running on their respective computing devices. In some instances, some users may want to see content items posted by the first user in their respective content feeds. To cause content items posted by the first user to be included in their respective content feed, a user can select an option through the interface to subscribe to, or "follow", the first user. As a result, some or all content items that are posted by the first user can automatically be included in the respective content feed of the user. If the user decides that they no longer want to see content from the first user in their respective content feed, the user can select an option through the interface to "unfollow" the first user.

The story module 106 can provide an option that allows users to post their content as stories. In such embodiments, each user has a corresponding story in which the user can post content. When a user's story is accessed by another user, the story module 106 can provide content posted in the story to the other user for viewing. In general, content posted in a user's story feed may be accessible by any user of the social networking system. In some embodiments, content posted in a user's story may only be accessible to followers of the user. In some embodiments, user stories expire after a pre-defined time interval (e.g., every 24 hours). In such embodiments, content posted in stories is treated as ephemeral content that is made inaccessible once the pre-defined time interval has elapsed. In contrast, content posted in a user's content feed can be treated as non-ephemeral content that remains accessible for an indefinite period of time. In some embodiments, captured images can be used as content for stories.

In some instances, users may want to associate music, video, or other audio/video content with their posted content items. To permit such association, in various embodiments, the sticker module 108 can be configured to provide users with access to various stickers. For example, stickers may be selected through an interface provided by a software application (e.g., a social networking application, browser, etc.) running on a computing device of a user. In this example, the user can interact with the interface to select one or more stickers to be inserted into one or more content items being posted by the user. In various embodiments, a sticker can be a visual overlay (e.g., image, icon, etc.) that references particular audio content (e.g., a song) or video content (e.g., a music video, a movie, etc.). In such embodiments, the sticker can be inserted into a given content item to visually identify the particular audio content or video content. In some embodiments, a user accessing the content item can select the sticker to access or play the referenced audio or video content. Many variations are possible. While music stickers and associated audio content are discussed herein with respect to various embodiments, the present disclosure also applies to other types of media content and related stickers, such as video stickers associated with video content. More details regarding the sticker module 108 will be provided below with reference to FIG. 2.

Figure 2:
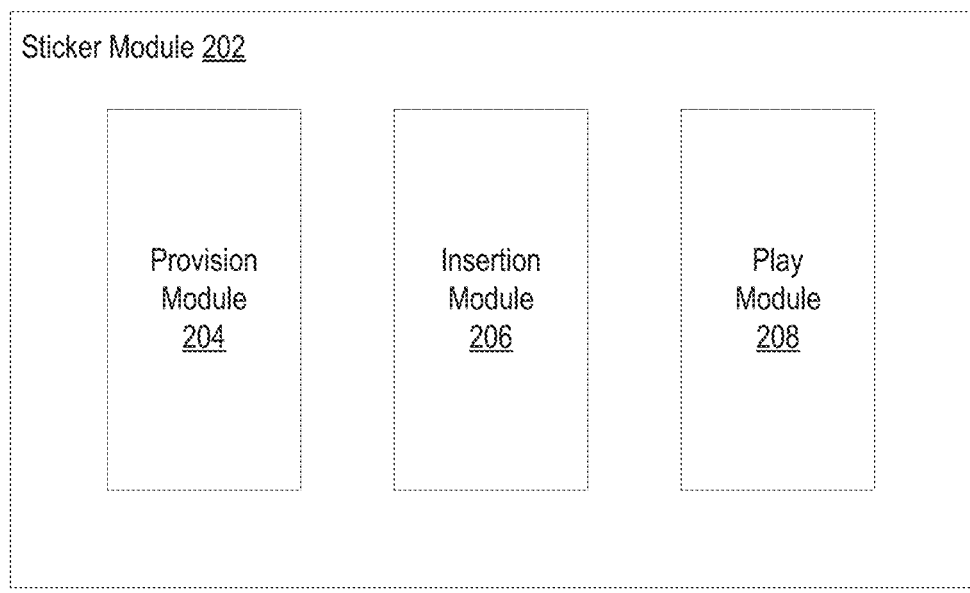
FIG. 2 illustrates an example sticker module, according to an embodiment of the present disclosure.

FIG. 2 illustrates a sticker module 202, according to an embodiment of the present disclosure. In some embodiments, the sticker module 108 of FIG. 1 can be implemented with the sticker module of 202. As shown in the example of FIG. 2, the sticker module 202 can include a provision module 204, an insertion module 206, and a play module 208.

In various embodiments, the provision module 204 can be configured to provide stickers, such as music stickers, that can be inserted into one or more content items. As mentioned, in some embodiments, a music sticker can reference particular audio content (e.g., a song). In some embodiments, a music sticker corresponding to a song can be represented using one or more visual overlays associated with the song (e.g., album art, song art, etc.). In some embodiments, such visual overlays can be obtained from one or more audio databases and/or music streaming services. In some embodiments, music stickers can be obtained, or downloaded, from a social networking system. In some embodiments, a user can select an option to purchase different sets of music stickers that are available through the social networking system. In general, a music sticker can include text, visual content, or a combination thereof. More details regarding the provision module 204 will be discussed below with reference to FIG. 3.

The insertion module 206 can be used to insert stickers, such as music stickers, into content items. For example, a music sticker can be inserted to visually identify some audio content that is referenced by the music sticker. Further, in some embodiments, the music sticker can be selected to access the referenced audio content, for example, from one or more music streaming services. In some embodiments, the insertion module 206 can insert music stickers into content items as overlays (or virtual stickers). In some embodiments, the insertion module 206 can insert music stickers into content items at some time interval. For example, a music sticker can be inserted into video at some elapsed time or some frame of the video. In various embodiments, inserted music stickers can be dragged and positioned as desired, for example, by performing various touchscreen gestures (e.g., drag gesture). In general, a user can resize inserted music stickers as desired, for example, by performing various touchscreen gestures (e.g., pinch gesture). Users can modify the presentation of music stickers using other approaches. For example, users can perform touchscreen gestures to rotate music stickers. It is contemplated that many variations are possible.

In various embodiments, the play module 208 can be configured to perform various operations when users select stickers, such as music stickers. For example, when a user operating a computing device selects a music sticker in a content item, the play module 208 can determine one or more audio sources from which audio content associated with the music sticker can be accessed. In some embodiments, these audio sources may correspond to one or more data stores that are accessible by the computing device. For example, the audio content associated with the music sticker may be accessible from a local data store of the computing device. In some embodiments, the audio sources may correspond to various music streaming services from which the audio content can be obtained (or accessed) and played. In some embodiments, the audio sources may correspond to various software applications through which the audio content can be obtained (or accessed) and played. In some embodiments, if no compatible software applications are installed on the computing device, the play module 208 can provide one or more options (e.g., hyperlinks) for downloading and installing compatible software applications. For example, such software applications may be available for download from an online app store. In some embodiments, the audio sources may correspond to different online music stores from which audio content associated with the music sticker can be purchased. Many variations are possible.

Figure 3:
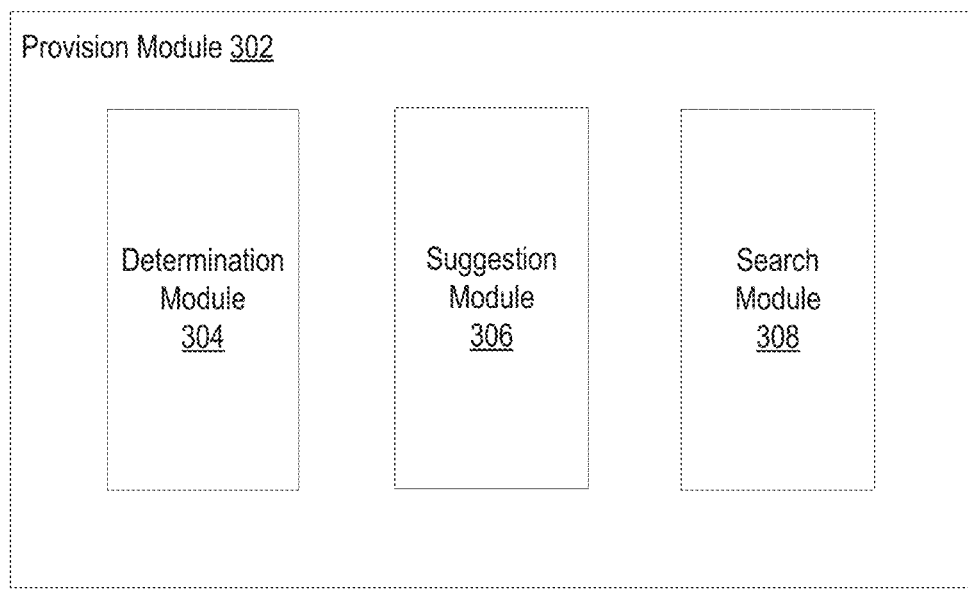
FIG. 3 illustrates an example provision module, according to an embodiment of the present disclosure.

FIG. 3 illustrates a provision module 302, according to an embodiment of the present disclosure. In some embodiments, the provision module 204 of FIG. 2 can be implemented with the provision module 302. As shown in FIG. 3, the provision module 302 can include a determination module 304, a suggestion module 306, and a search module 308.

As mentioned, the provision module 302 can be configured to provide access to stickers, such as music stickers, that can be inserted into content items. In various embodiments, access to music stickers can be provided through an interface (e.g., a music sticker interface). The interface may be provided by a software application running on a computing device, for example. A user operating the computing device can interact with the interface to insert and manipulate the presentation of music stickers in content items. In some embodiments, music stickers made accessible through the interface can vary based on audio being played using the computing device and/or audio that was recently played using the computing device. For example, in some embodiments, the determination module 304 can identify a song being played using the computing device. The song can be identified based on conventional techniques, such as reading metadata associated with the song that provides identifying information or analyzing audio data of the song against an audio database of known songs, to name some examples. The determination module 304 can obtain one or more music stickers corresponding to the song. These obtained music stickers can then be provided for selection through the interface. In various embodiments, the social networking system can maintain information describing associations between music stickers and various types of audio content (e.g., music albums, songs, artists, etc.). In some embodiments, such music stickers may be obtained, using content from various audio databases and/or content providers (e.g., music streaming services, etc.). For example, the determination module 304 can obtain music stickers by accessing such audio databases and/or content providers through one or more publicly available application programming interfaces (APIs).

In some embodiments, music stickers can be provided through the interface as suggestions. For example, in some embodiments, the suggestion module 306 can suggest music stickers corresponding to songs that are popular in a relevant geographic region. In some embodiments, the suggestion module 306 can obtain a listing of popular songs from various third-party content providers (e.g., online music services, online music charts, etc.) using various publicly available APIs. The suggestion module 306 can determine corresponding music stickers for audio content included in the listing. These music stickers can then be provided for selection through the interface. For example, if a geographic region associated with a computing device corresponds to San Francisco, Calif., then, in some embodiments, the suggestion module 306 can provide a listing of popular songs in the United States, in California, and/or in the city of San Francisco, for example. Many variations are possible.

In some embodiments, the search module 308 can provide through the interface a search option for obtaining stickers, such as music stickers, that were not identified by the determination module 304 or the suggestion module 306. The search module 308 can identify song names and corresponding music stickers that are responsive to search terms. A user operating a computing device can provide the search terms. The search module 308 can provide the identified music stickers for selection through the interface.

Figure 4A:
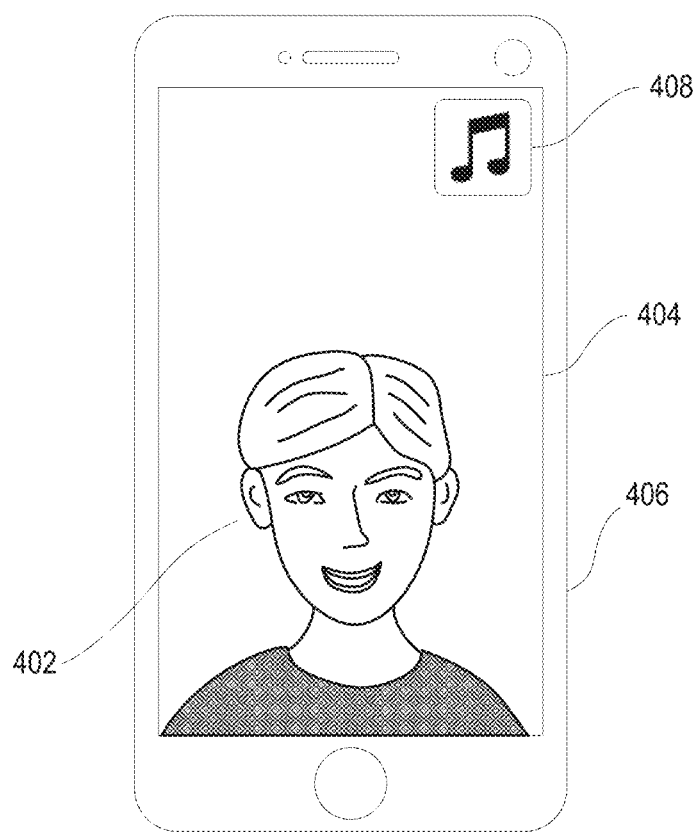
FIGS. 4A-4C illustrate example diagrams, according to an embodiment of the present disclosure.
Figure 4B:
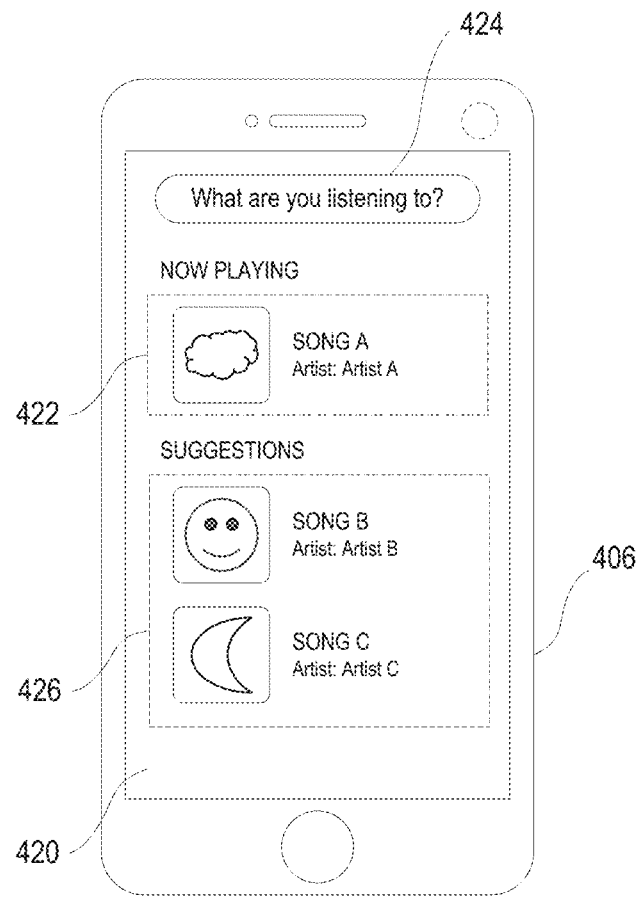
Figure 4C:

FIG. 4A illustrates an example diagram 400, according to an embodiment of the present disclosure. In the example of FIG. 4A, a user operating a computing device 406 has identified a content item 402 to be published through a social networking system. The content item 402 can be identified using an interface 404 presented on a display screen of the computing device 406. The interface 404 may be provided through an application (e.g., a web browser, a social networking application, etc.) running on the computing device 406. In general, the content item 402 may correspond to an existing content item that is stored on the computing device 406 or a content item that was captured using one or more cameras associated with the computing device 406. In some embodiments, the user can select an option 408 to insert one or more music stickers in the content item 402. In other embodiments, other types of stickers, such as video stickers, can be inserted. For example, as illustrated in the example of FIG. 4B, the option 408 has been selected to access a music sticker interface 420. In this example, the music sticker interface 420 provides a number of music stickers that can be selected and inserted into the content item 402. In some embodiments, if audio content is being played using the computing device 406, the music sticker interface 420 provides a music sticker 422 corresponding to the audio content being played. In some embodiments, the music sticker interface 420 provides one or more suggested music stickers 426 that can be inserted into the content item 402. Further, in some embodiments, the user operating the computing device 406 can use a search box 424 to perform searches for music stickers, for example, using search terms that reference particular audio content (e.g., an artist, album, song, genre, etc.). Many variations are possible. Once selected, a music sticker 422 can be inserted as a visual (or graphical) overlay in the content item 402 as shown in FIG. 4C. In various embodiments, the user can perform actions to modify the manner in which the selected music sticker 422 is presented. For example, the user can perform touchscreen gestures to move, enlarge, shrink, and/or rotate the music sticker 422. Once satisfied with the appearance of the music sticker 422 in the content item 402, the user can select an option to publish the content item 402 through the social networking system. In some embodiments, the content item 402 can be published as a story. Many variations are possible.

Figure 4D:
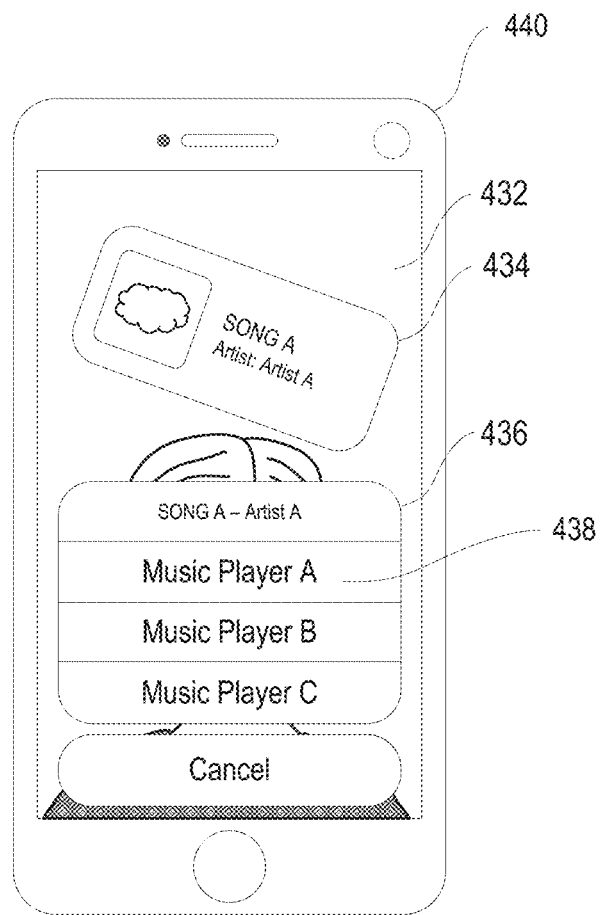
FIG. 4D illustrates another example diagram, according to an embodiment of the present disclosure.

FIG. 4D illustrates an example diagram 430, according to an embodiment of the present disclosure. In the example of FIG. 4D, a user operating a computing device 440 is accessing a content item 432 in which a music sticker 434 has been inserted. For example, the content item 432 can be the content item 432 as described above in reference to FIGS. 4A-4C. In some embodiments, the user operating the computing device 440 can select the music sticker 434 to play audio content associated with the music sticker 434. In some embodiments, selecting the music sticker 434 reveals a set of options 436 for accessing the audio content associated with the music sticker 434. For example, the options may be selected to launch one or more software applications (e.g., a music player, online music service application, etc.) through which the associated audio content can be accessed. For example, the user operating the computing device 440 can select an option 438 to access the audio content using a "Music Player A" application, which is associated with one of many audio sources. In some embodiments, if no software applications for accessing the audio content are available, one or more of the options can be selected to install such software applications on the computing device 440. For example, an option can be selected to download and install an appropriate software application from an online app store.

FIG. 5A illustrates an example method 500, according to an embodiment of the present disclosure. It should be appreciated that there can be additional, fewer, or alternative steps performed in similar or alternative orders, or in parallel, within the scope of the various embodiments unless otherwise stated.

At block 502, the example method 500 provides one or more candidate stickers through a display screen of a computing device. At block 504, the example method 500 determines that a user has selected a first sticker from the one or more candidate stickers. At block 506, the example method 500 inserts the first sticker as a graphical overlay into a content item, wherein the first sticker references first content.

FIG. 5B illustrates an example method 510, according to an embodiment of the present disclosure. Similarly, it should be appreciated that there can be additional, fewer, or alternative steps performed in similar or alternative orders, or in parallel, within the scope of the various embodiments unless otherwise stated.

At block 512, the example method 510 presents one or more stickers as visual overlays in a content item. At block 514, the example method 510 determines that a user has selected a first sticker from the one or more stickers in the content item. At block 516, the example method 510 accesses audio associated with the first sticker.

It is contemplated that there can be many other uses, applications, features, possibilities, and/or variations associated with the various embodiments of the present disclosure. For example, in some instances, the disclosed technology can provide the one or more music stickers based on music previously played by users using machine learning techniques. The disclosed technology can also suggest music stickers based on what followers of the users are listening to. Additionally, in some cases, users can choose whether or not to opt-in to utilize the disclosed technology. The disclosed technology can, for instance, also ensure that various privacy setting and preferences are maintained and can prevent private information from being divulged. In another example, various embodiments of the present disclosure can learn, improve, and/or be refined over time.

Social Networking System—Example Implementation

Figure 6:
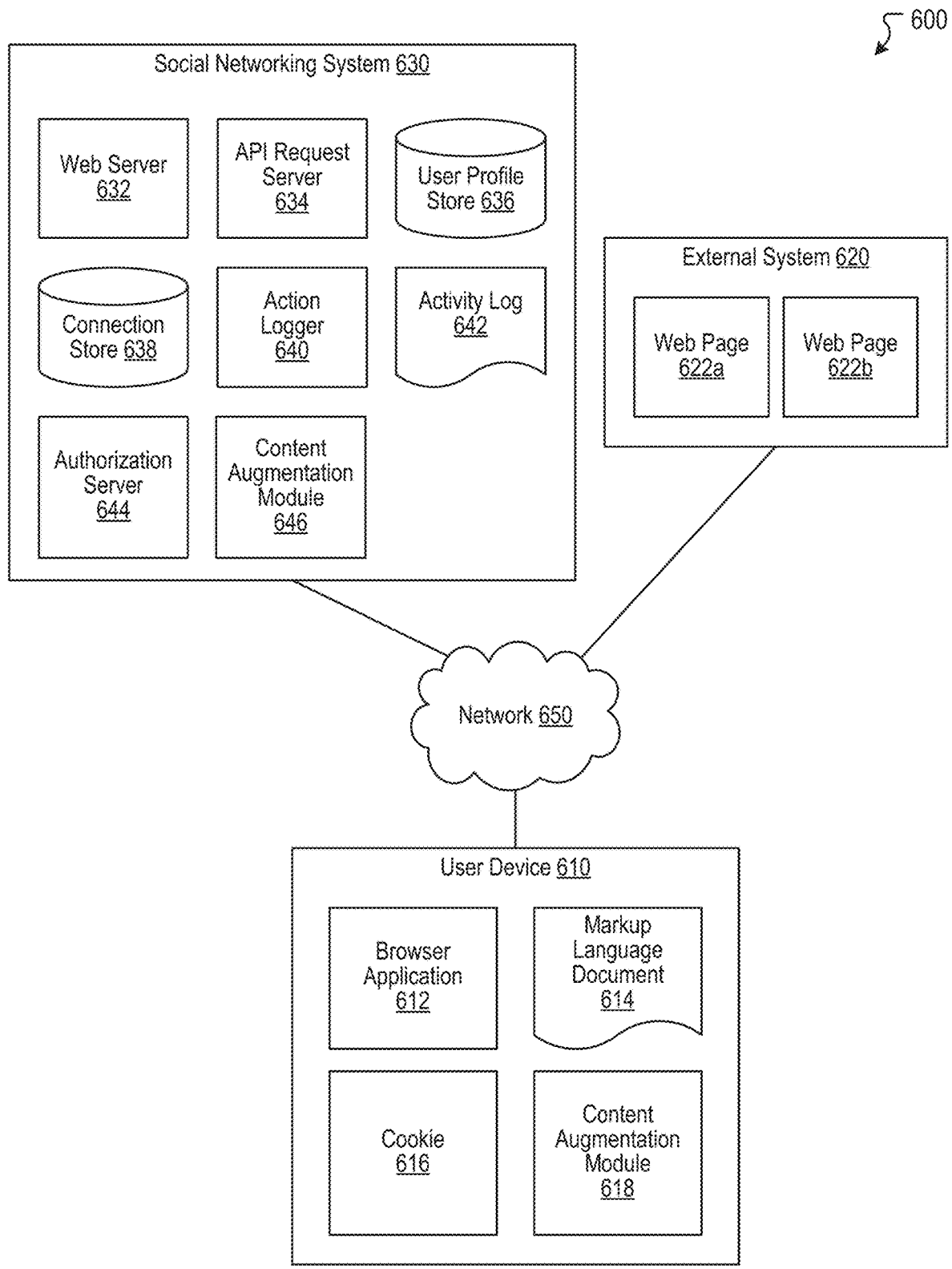
FIG. 6 illustrates a network diagram of an example system that can be utilized in various scenarios, according to an embodiment of the present disclosure.

FIG. 6 illustrates a network diagram of an example system 600 that can be utilized in various scenarios, in accordance with an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices (or systems) that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the Silverlight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622*a*, 622*b*, included in the external system 620, comprise markup language documents 614 identifying content and including instructions specifying formatting or presentation of the identified content. As discussed previously, it should be appreciated that there can be many variations or other possibilities.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622*a* within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, a content augmentation module 646 can be implemented in the social networking system 630. The content augmentation module 646 can, for example, be implemented as the content augmentation module 102 of FIG. 1 in whole or in part. In some embodiments, a content augmentation module 618 can be implemented in the user device 610. The content augmentation module 618 can, for example, be implemented as the content augmentation module 102 of FIG. 1 in whole or in part. As discussed previously, it should be appreciated that there can be many variations or other possibilities.

Hardware Implementation

Figure 7:
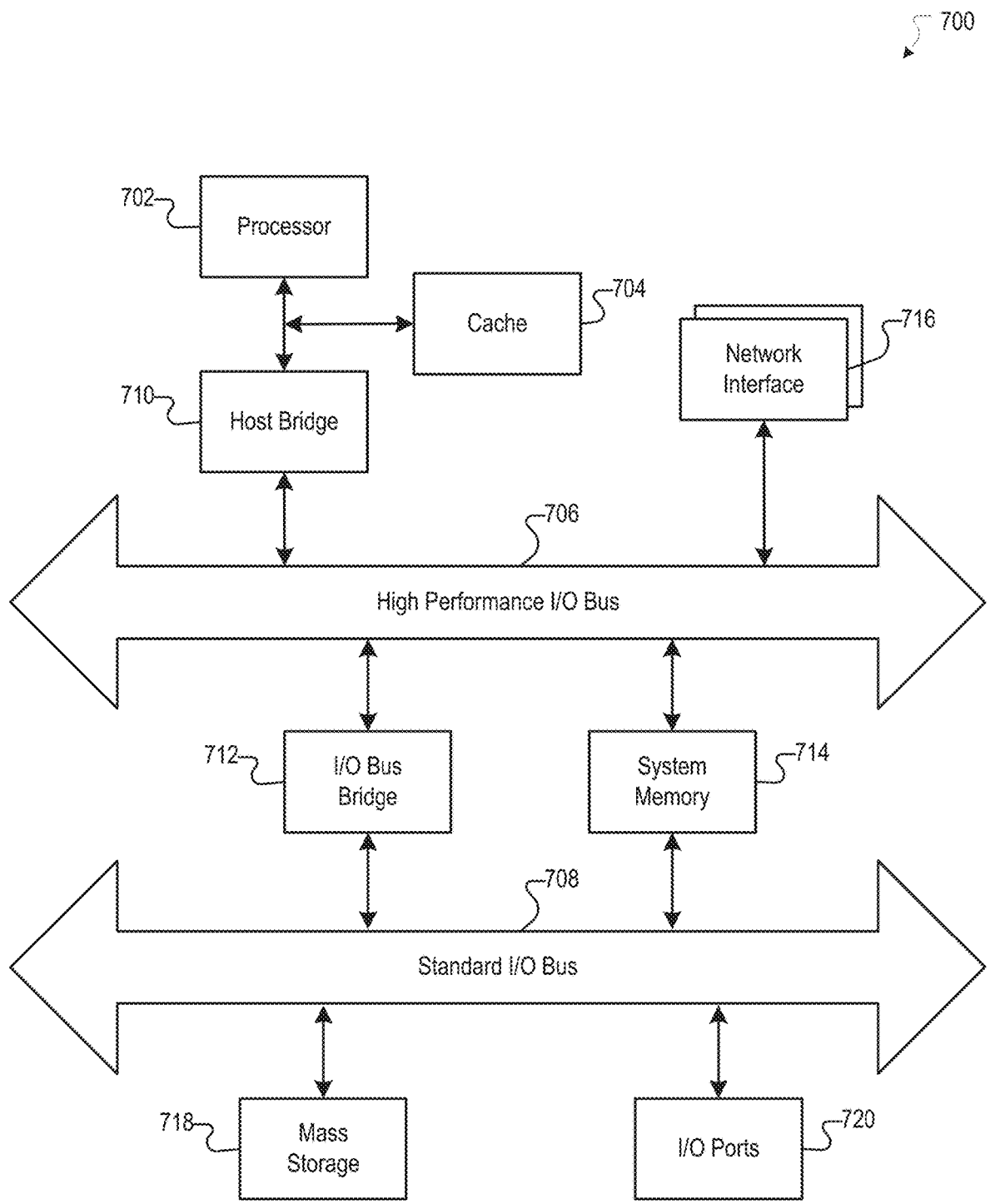
FIG. 7 illustrates an example of a computer system that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 620, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
    receiving, by a computing system, a list of audio content accessed by followers of a user;
    determining, by the computing system, audio content being played on a computing device;
    receiving, by the computing system, a search performed by the user;
    providing, by the computing system, one or more candidate stickers based on the list of audio content, the audio content being played, and the search performed by the user;
    determining, by the computing system, that the user has selected a first sticker from the one or more candidate stickers; and
    inserting, by the computing system, the first sticker as a visual overlay in a content item, wherein the inserting comprises:
        determining at least one of an elapsed time or a frame of the content item at which to insert the first sticker; and
        inserting the first sticker in the content item at the elapsed time or the frame.

2. The computer implemented method of claim 1, wherein the list of audio content is obtained from the at least one music streaming service through one or more publicly available application programming interfaces (APIs).

3. The computer implemented method of claim 1, wherein an application to play audio content associated with the first sticker is installable based on selection of the first sticker.

4. The computer-implemented method of claim 1, wherein the visual overlay includes content visually representing the first content.

5. The computer-implemented method of claim 1, wherein the first content corresponds to at least an album, a song, a movie, a video, or other audio or video content.

6. The computer-implemented method of claim 1, wherein the first sticker is able to be selected to play the first content.

7. The computer-implemented method of claim 1, wherein the first sticker is able to be selected to download the first content.

8. A system comprising:
    at least one processor; and
    a memory storing instructions that, when executed by the at least one processor, cause the system to perform:
    receiving a list of audio content accessed by followers of a user;
    determining audio content being played on a computing device;
    receiving a search performed by the user;
    providing one or more candidate stickers based on the list of audio content, the audio content being played, and the search performed by the user;
    determining that the user has selected a first sticker from the one or more candidate stickers; and
    inserting the first sticker as a visual overlay in a content item, wherein the inserting comprises:
        determining at least one of an elapsed time or a frame of the content item at which to insert the first sticker; and
        inserting the first sticker in the content item at the elapsed time or the frame.

9. The system of claim 8,
    wherein an application to play audio content associated with the first sticker is installable based on selection of the first sticker.

10. A non-transitory computer-readable storage medium including instructions that, when executed by at least one processor of a computing system, cause the computing system to perform a method comprising:
    receiving a list of audio content accessed by followers of a user;
    determining audio content being played on a computing device;
    receiving a search performed by the user;
    providing one or more candidate stickers based on the list of audio content, the audio content being played, and the search performed by the user;
    determining that the user has selected a first sticker from the one or more candidate stickers; and
    inserting the first sticker as a visual overlay in a content item, wherein the inserting comprises:
        determining at least one of an elapsed time or a frame of the content item at which to insert the first sticker; and
        inserting the first sticker in the content item at the elapsed time or the frame.

11. The non-transitory computer-readable storage medium of claim 10,
    wherein an application to play audio content associated with the first sticker is installable based on selection of the first sticker.

* * * * *